United States Patent Office 2,755,194
Patented July 17, 1956

2,755,194

ORGANOSILOXANE EMULSIONS

Ronald J. Volkmann and Henry J. Baecker, Midland, Mich., assignors to Dow Corning Corporation, Midland, Mich., a corporation of Michigan No Drawing. Application February 7, 1955, Serial No. 486,704

3 Claims. (Cl. 106—285)

This invention relates to novel organosiloxane emulsions and to methods for preparing them.

Organosiloxane emulsions, especially oil-in-water type emulsions, have been employed for a wide variety of uses such as car and furniture polishes, release agents, medicinal preparations, cosmetics and so forth. The unique properties of organosiloxanes and the ease with which organosiloxane emusions can be used have assured them of an expanding popularity in industry.

One of the most important properties sought in an emulsion is stability. An emulsion can be defined as a dispersion of fine liquid particles within another immiscible liquid. Such dispersions have a tendency to "break" or "cream." A very unstable dispersion, such as benzene in water, will separate very rapidly and can hardly be called an emulsion. The very best emulsions exhibit practically no "creaming" and are said to be stable.

There are many factors involved in the stability of emulsions and among the important factors are the emulsifying agent or agents employed, the particle size of the dispersed liquid, the nature of the dispersed liquid and the continuous or dispersing liquid, etc. Many experiments have been carried out and much has been written concerning such factors with relation to organosiloxane-water emulsions. In fact, relatively satisfactory siloxane-water emulsions have been available heretofore but certain deficiencies are still present.

Heretofore, the organosiloxane-water emulsions have been largely inconsistent in their behavior. One production batch would be very stable, whereas the next batch might prove to have quite unsatisfactory stability. Unfortunately, the emulsions often "break" or cream after they have been shipped to the ultimate user (e. g., a rubber fabricator for use in rubber molds). The consumer usually fails to recognize that separation has occurred until he finds that the supposed emulsion is not accomplishing the desired result (e. g., the rubber sticks to the molds rather than being freely released). Therefore, it is of primary economic importance to the consumer and the producer of organosiloxane-water emulsions that a consistently stable emulsion be found.

Separation or creaming in an emulsion can be the result of many variables including repeated freezing and thawing of the emulsion, protracted standing, too large particle size in the emulsion as produced, etc.

It is the primary object of this invention to prepare an organosiloxane in water emulsion exhibiting a consistently reproducible degree of stability heretofore unavailable. Another object is to produce an emulsion having a uniformly fine particle size heretofore unobtainable. A further object is to produce an emulsion which will not separate or cream after repeated freezing and thawing. A further object is to produce an organosiloxane in water emulsion which remains stable on storage for several months or years. Other objects and advantages achieved through this invention are detailed in or will be apparent from the following specification and appended claims.

In accordance with this invention an organosiloxane in water emulsion is prepared consisting essentially of (A) from .05 to 90 percent by weight based on the total emulsion of an organic solvent soluble organopolysiloxane having the unit formula $$R_nSiO_{\frac{4-n}{2}}$$

wherein R is selected from the group consisting of monovalent hydrocarbon radicals and halogenated monovalent hydrocarbon radicals and $n$ has an average value of from .9 to 3.0, (B) from 3 to 45 percent by weight based on the weight of (A) of a trimethylnonly ether of polyethylene glycol, (C) .1 to 1.5 percent by weight based on the weight of (A) of a sodium salt of an alkylated aryl polyether sulfate, and (D) 10–99.95 percent by weight water.

The organosiloxane ingredient (A) supra] can be any organosilicon compound having the average unit formula $$R_nSiO_{\frac{4-n}{2}}$$

wherein R can be any monovalent hydrocarbon radical or any halogenated monovalent hydrocarbon radical. R can represent more than one type of the defined radicals in any particular molecule or can represent only one type of radical. Illustrative of the wide range of radicals R can represent are alkyl radicals such as methyl, ethyl, butyl and octadecyl; alkenyl radicals such as vinyl and allyl; aryl radicals such as phenyl, naphthyl and xenyl; alicyclic radicals such as cyclohexenyl, cyclopentyl and cyclohexyl; alkaryl radicals such as tolyl and xylyl; and aralkyl radicals such as benzyl, and/or any halogenated monovalent hydrocarbon radical such as tetrafluoroethyl, perfluorovinyl, dichlorophenyl, α,α,α-trifluorotolyl and so forth.

The organosiloxanes which are operative herein range from resins having an average of .9 organic radical per silicon atom to liquids having an average of 3 organic radicals per silicon atom. It is apparent to those skilled in the art that the siloxane must be a liquid or must be soluble in an organic solvent in order to prepare an emulsion therefrom. Any siloxane having 2 or 3 organic radicals per silicon atom can be characterized as a liquid although the viscosity of such material can range from less than 10 cs. at 25° C. to more than 10,000,000 cs. at 25° C. The resinous siloxanes (i. e., degree of substitution=.9 to 2) can be in the liquid state or can be solid or gel-like and yet be operative herein so long as they can be dissolved in an organic solvent such as toluene, benzene, naphtha and other petroleum solvents, etc. Preferred are the organosiloxanes having 2 to 3 organic groups per silicon atom.

There are two emulsifying agents employed herein. A trimethylnonyl ether of polyethylene glycol is employed in conjunction with a sodium salt of any alkyl aryl polyether sulfate. It has been found that when these two agents are employed in the emulsions of this invention in the amounts specified, significantly better emulsions are obtained than could be prepared with either agent alone or in combination with any other agent. The particle size of the dispersed organosiloxane is greatly reduced to .5 microns and smaller. As a result of this outstanding and unexpected reduction in particle size the dispersed particles are more uniform in size and are more uniformly distributed throughout the emulsion system. This in turn results in increased heat stability, reduces the creaming to the point of eliminating it, and allows easy dilution of the emulsion to any desired useful concentration (e. g., .05 percent by weight silicone).

From a practical, commercial standpoint, the emulsions of this invention are extremely welcome to the producer and the consumer. The producer can be assured of uniform quality of product and good product control. This reduces costly returns of unsatisfactory material and saves time and money heretofore spent in trying to obtain a commercially salable product from the unsatisfactory batches of emulsion.

The consumer is now assured of a non-creaming emulsion exhibiting improved properties over those obtained with earlier commercial emulsions. Because of the uniformity of the new emulsion, any coating made with it will be more uniform in thickness and quality. Further, special handling techniques heretofore employed have been largely eliminated with the emulsions of this invention.

The emulsions of this invention can be prepared in any desired manner. The preferred method is to add the trimethylnonyl ether of polyethylene glycol and the sodium salt of alkyl aryl polyether sulfate to the organosiloxane, and intimately intermix them by milling or mixing by any desired means. This mixture is then added to water with appropriate mixing techniques employed to secure a stable, uniform emulsion. Alternatively, all of the ingredients can be admixed in a single step by adding them together and mixing.

The amount of organosiloxane employed should be at least 0.5 percent by weight based on the total weight of the emulsion. Although this invention is operative with less than .05 percent of organosiloxane, it is impractical to reduce the organosiloxane below this amount and thus practically dilute out its effectiveness. The upper limit on the proportion of organosiloxane to water lies at the inversion point of the emulsion, that is at the point where the organosiloxane in water emulsion inverts to become a water in organosiloxane emulsion. This is generally at a point of about 90 percent by weight organosiloxane.

The emulsions of this invention are primarily useful as mold release agents such as are employed by rubber fabricators, plastics fabricators, etc. They are also useful in emulsions employed to render fabrics and/or leather water repellent. Various uses of these materials will require the addition of rust inhibitors, anti-oxidants and other additives and this invention is intended to include the addition of minor amounts of such additives.

The following examples are included as illustrative of the instant invention and do not in any way restrict the scope of the invention which is properly delineated in the claims. All parts and percentages in the examples are based on weight unless otherwise specified.

*Example 1*

35 parts of a dimethylsiloxane fluid having a viscosity of 350 cs. at 25° C. were added to 1.8 parts of trimethylnonyl ether of polyethylene glycol, having a molecular weight of about 609, and containing 9 to 11 ethylene oxide radicals per molecule (available commercially as Tergitol TMN) and .15 part of a sodium salt of alkyl aryl polyether sulfate (available commercially as Triton W–30). This mixture was manually mixed using a stirring rod. 5 parts of water were added to the mixture and the entire mix was sent through a colloid mill. Thereafter 10 parts of water were added and the mix again was sent through the colloid mill. Finally 47.5 parts of water were added with the mix again being sent through the colloid mill. The colloid mill was set at medium for the first milling operation and was set progressively finer with each succeeding milling until on the final milling it was set at the extremely fine position. The resulting emulsion had particles of .5 μ or lower. It was very stable and did not cream after months on the shelf. Centrifuging for 30 minutes at an average force of 1200 times the force of gravity produced less than 2 percent separation and gentle shaking quickly rehomogenized the emulsion. The emulsion did not break or cream after extended heating and boiling nor did repeated freezing and thawing result in separation or creaming. This emulsion was the equal of any heretofore known in all physical properties and was far superior in heat stability, shelf life, compatibility, ease of emulsifying and dilution, average particle size, hard water stability and pumping stability.

*Example 2*

Employing the method of Example 1, an emulsion was prepared containing 35 parts of a phenylmethylsiloxane copolymer consisting of 50 mol percent phenylmethylsiloxane, 28 mol percent monomethylsiloxane, 14 mol percent monophenylsiloxane, and 8 mol percent diphenylsiloxane dissolved in 35 parts xylene, 2.8 parts of the trimethylnonyl ether of polyethylene glycol of Example 1, .2 parts of the sodium salt of alkyl aryl polyether sulfate of Example 1 and 61 parts water. This emulsion was equivalent to that which was obtained in Example 1.

*Example 3*

Equivalent results are obtained when a vinylmethylsiloxane or any chlorophenylethylsiloxane is substituted for the dimethylsiloxane of Example 1.

That which is claimed is:

1. An organosiloxane in water emulsion consisting essentially of (A) from .05–90 percent by weight based on the total emulsion of an organic solvent soluble organosiloxane having the unit formula $$R_n SiO_{\frac{4-n}{2}}$$

wherein R is selected from the group consisting of monovalent hydrocarbon radicals and halogenated monovalent hydrocarbon radicals and $n$ has an average value of from .9 to 3.0 inclusive, (B) from 3 to 45 percent by weight based on the weight of (A) of a trimethylnonyl ether of polyethylene glycol, (C) .1 to 1.5 percent by weight based on the weight of (A) of a sodium salt of an alkylated aryl polyether sulfate, and (D) the balance of the emulsion being water.

2. The composition of claim 1 in which ingredient (A) is dissolved in an organic solvent.

3. The composition of claim 1 in which the organosiloxane is a methylsiloxane.

References Cited in the file of this patent

UNITED STATES PATENTS

| | | |
|---|---|---|
| 2,523,281 | Currie | Sept. 26, 1950 |
| 2,584,413 | Baer | Feb. 5, 1952 |
| 2,666,685 | Hommel et al. | Jan. 19, 1954 |
| 2,702,276 | Green | Feb. 15, 1955 |

UNITED STATES PATENT OFFICE

CERTIFICATE OF CORRECTION

Patent No. 2,755,194                                        July 17, 1956

Ronald J. Volkmann et al.

It is hereby certified that error appears in the printed specification of the above numbered patent requiring correction and that the said Letters Patent should read as corrected below.

Column 3, line 22, for "0.5 percent" read -- .05 percent --.

Signed and sealed this 18th day of September 1956.

(SEAL)
Attest:

KARL H. AXLINE                                                ROBERT C. WATSON

Attesting Officer                                       Commissioner of Patents